No. 690,566. Patented Jan. 7, 1902.
Z. E. DRAKE & J. C. SEMPLE.
FLY TRAP.
(Application filed May 6, 1901.)
(No Model.)
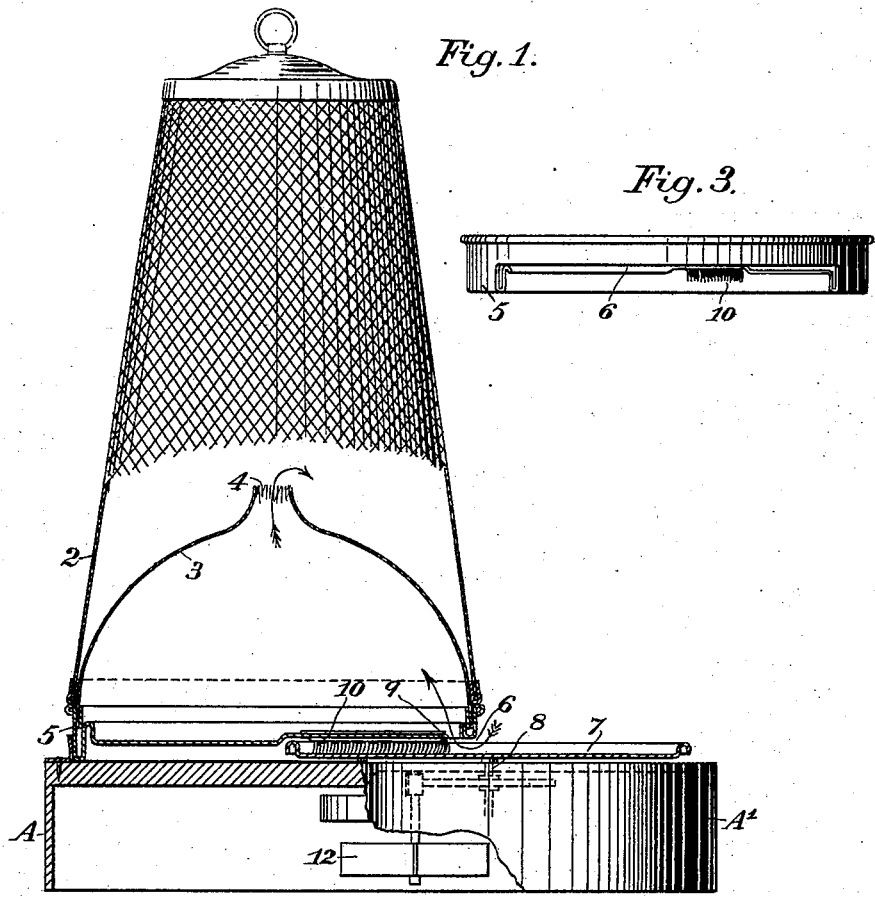
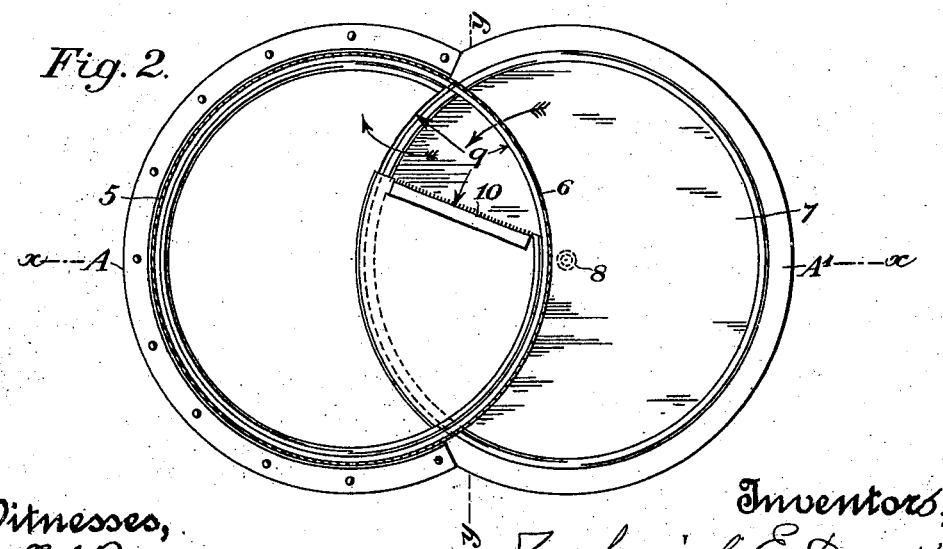
Witnesses,
E. A. Brandau
J. A. Nurse
Inventors,
Zachariah E. Drake
James C. Semple
By Dewey Strong & Co.
atty

UNITED STATES PATENT OFFICE.

ZACHARIAH E. DRAKE AND JAMES C. SEMPLE, OF MODESTO, CALIFORNIA.

FLY-TRAP.

SPECIFICATION forming part of Letters Patent No. 690,566, dated January 7, 1902.

Application filed May 6, 1901. Serial No. 58,871. (No model.)

*To all whom it may concern:*

Be it known that we, ZACHARIAH E. DRAKE and JAMES C. SEMPLE, citizens of the United States, residing at Modesto, county of Stanislaus, State of California, have invented an Improvement in Fly-Traps; and we hereby declare the following to be a full, clear, and exact description of the same.

Our invention relates to a device for entrapping flies.

It consists of a cage and receiver, a base upon which it is located, a horizontally-revoluble baited table, with the axis so disposed that the periphery of the table passes into the cage or receiver during its revolution, and a brush by which the flies are removed from the table before it again emerges to the outside.

It also comprises details of construction, which will be more fully explained by reference to the accompanying drawings, in which—

Figure 1 is a part vertical section and part longitudinal elevation of our invention looking along the line $x$ $x$ of Fig. 2. Fig. 2 is a plan, the receiver and cage being omitted. Fig. 3 is a view of the base-ring looking along the line $y$ $y$ of Fig. 2.

As here shown, the base is formed in two parts A and A', having a sufficient depth, and the part A has a horizontal tabular surface upon which the receiver 2 is placed. This receiver is preferably made of wire-gauze or material which will admit light, and within it is a conical cage 3, having an opening in the apex, as at 4. The receiver and cage are fixed to a base-ring 5, which is adapted to rest upon the tabular surface of the base A, and its ring has a portion cut away, as shown at 6.

7 is a circular disk, which may have an upturned edge or flange, and this disk is centrally fixed upon a revoluble spindle 8, which extends upwardly from the part A' of the base. The disk is so located with relation to the ring 5 of the cage that a portion of its periphery rotates through the opening 6 into the cage and again passes out upon the opposite side, so that a considerable portion of the disk is also exposed outside of the cage. The disk is baited in any suitable manner, as with sugar or other substance which will attract flies, and as it rotates, flies which have lighted upon the disk exterior to the cage will be carried into the cage through the open space 6, which is of sufficient height for that purpose.

Within the cage and connected with it is a segment 9, having a radius from approximately the center of revolution of the disk. This segment is raised above the tabular surface of A, and the edge presented to the incoming revolving disk has a flexible brush or other material, as at 10, which acts to brush the flies off the disk when they reach it. The disk then passes beneath the brush and into the inclosed portion of the segment, flies being prevented from entering this portion by the brush and by the exterior rim of the segment, which extends down close to the tabular surface. The flies being thus brushed off, the disk will fly upward toward the light, and moving up the interior of the cage, as is their habit, they will arrive at the opening at the top and thence pass into the receiver above, where as many of them may be collected as desirable. From time to time the receiver is taken off and the top removed or other opening uncovered and the flies drowned, burned, or otherwise destroyed.

In order to operate the revolving disk, the spindle is connected with any suitable clockwork mechanism inclosed in the base A' and operated by spring or other power. A suitable fan, as at 12, regulates the movement of the clockwork and limits the speed of rotation, so that the disk will move slowly enough not to frighten the flies and prevent their lighting thereon. The apparatus thus constructed is very efficient for the purpose.

Having thus described our invention, what we claim as new, and desire to secure by Letters Patent, is—

1. A fly-trap consisting of a cage having an opening in the top, a receiver into which said opening delivers said cage and receiver having a ring at the bottom with a cut-away portion, a base having a horizontal surface upon which the ring rests, a horizontally-revoluble disk having its axis of rotation in line with the edge of the ring whereby its periphery is continually carried through the space in the ring into the interior of the cage, and outwardly therefrom, a closed segment located within the cage having its center approximately in the line of the axis of the disk, an open space in one side provided with a flexible brush beneath which the disk is carried within the cage to remove the flies therefrom.

2. A fly-trap consisting of a cage and receiver with connecting-opening between, a ring at the bottom of the cage having a cut-away portion, a base having a horizontal tabular surface upon one portion upon which the cage and receiver are supported, a clockwork and regulating mechanism contained in the other portion, a disk mounted upon a shaft driven by the clockwork, said shaft standing approximately in line with the edge of the cage whereby the disk revolves with a portion interior to, and another portion exterior to the cage, an inclosed segment located within the cage above the tabular surface of the base having a flexible brush upon the side through which the disk enters the segment whereby flies are carried into the cage by the revolution of the disk and removed therefrom by the brush to subsequently escape into the supplemental receiver.

In witness whereof we have hereunto set our hands.

ZACHARIAH E. DRAKE.
JAMES C. SEMPLE.

Witnesses:
H. A. DRAKE,
J. S. WOOTTEN.